(12) United States Patent
Elder et al.

(10) Patent No.: US 9,841,517 B2
(45) Date of Patent: Dec. 12, 2017

(54) WIRELESS SEISMIC SYSTEM WITH PHASED ANTENNA ARRAY

(71) Applicant: Wireless Seismic, Inc., Louisville, CO (US)

(72) Inventors: Keith Elder, Sugar Land, TX (US); Andrew T. Prokop, Sugar Land, TX (US); Steven Kooper, Richmond, TX (US)

(73) Assignee: Wireless Seismic, Inc., Sugar Land, TX (US)

(*) Notice: Subject to any disclaimer, the term of this patent is extended or adjusted under 35 U.S.C. 154(b) by 0 days.

(21) Appl. No.: 14/042,251

(22) Filed: Sep. 30, 2013

(65) Prior Publication Data
US 2014/0269187 A1 Sep. 18, 2014

Related U.S. Application Data
(60) Provisional application No. 61/707,584, filed on Sep. 28, 2012.

(51) Int. Cl.
*G01V 1/22* (2006.01)
(52) U.S. Cl.
CPC .................... *G01V 1/223* (2013.01)
(58) Field of Classification Search
CPC ............................ G01V 1/223; G01V 2210/55
USPC ........................................................ 367/76–78
See application file for complete search history.

(56) References Cited

U.S. PATENT DOCUMENTS

| 7,304,976 | B2 * | 12/2007 | Mao | H01Q 1/246 340/870.11 |
| 7,773,457 | B2 | 8/2010 | Crice et al. | |
| 2008/0049554 | A1 * | 2/2008 | Crice | G01V 1/223 367/79 |
| 2011/0149686 | A1 * | 6/2011 | Ray | G01V 1/223 367/77 |
| 2011/0158040 | A1 * | 6/2011 | Kooper | G01V 1/223 367/13 |

OTHER PUBLICATIONS

"Multiplexing," Wikipedia, Aug. 21, 2011, downloaded Sep. 7, 2015 from https://en.wikipedia.org/w/index.php?title=Multiplexing &oldid=445907763, 9 pp.*
"Reciprocity (electromagnetism)," Wikipedia, Dec. 2010, downloaded Jun. 10, 2016, 7 pp.*
"Smart antenna," Wikipedia, Jun. 2011, downloaded Sep. 7, 2015, 4 pp.*

* cited by examiner

*Primary Examiner* — Daniel L Murphy
(74) *Attorney, Agent, or Firm* — Marsh Fischmann & Breyfogle LLP

(57) ABSTRACT

Systems and methods for utilization of a smart antenna in facilitating wireless communication between adjacent seismic data acquisition modules. The smart antenna may target an adjacent module with a radiation pattern directed toward the adjacent module. As such, the modules may employ space division multiplexing techniques to avoid interference between modules in the array. The modules may scan throughout a continuum of positions to locate adjacent modules. Once located, a spatial signal signature may be identified for the adjacent module and beamforming vectors may be calculated for targeting the radiation pattern toward the located module.

13 Claims, 6 Drawing Sheets

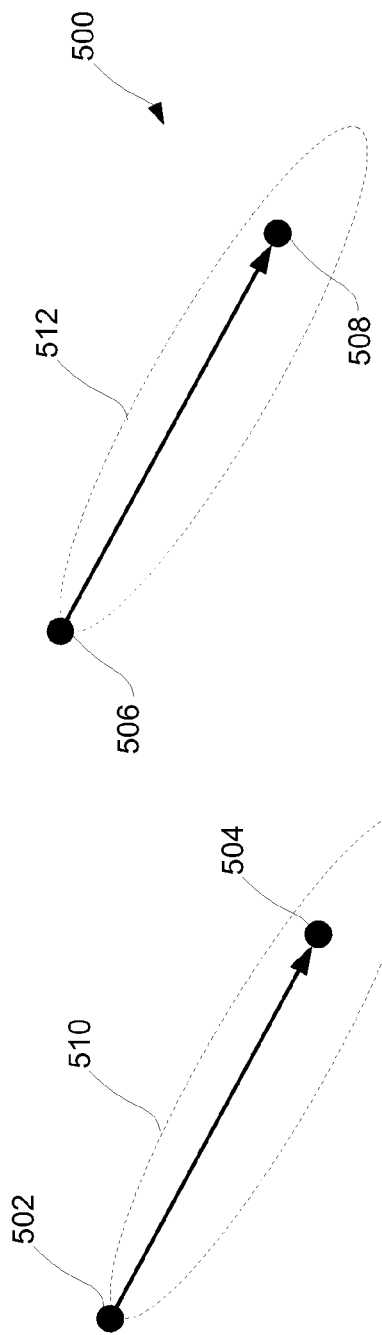
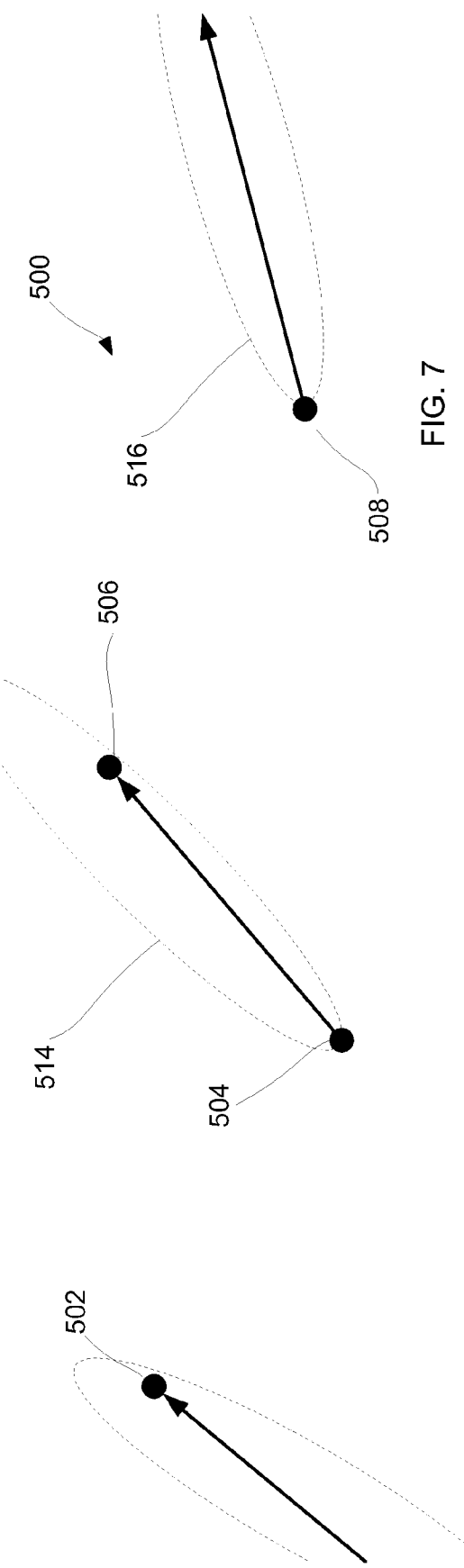
FIG. 6
FIG. 7

WIRELESS SEISMIC SYSTEM WITH PHASED ANTENNA ARRAY

CROSS REFERENCE TO RELATED APPLICATIONS

This application is a non-provisional of U.S. Provisional Application No. 61/707,584 filed on Sep. 28, 2012 entitled "WIRELESS SEISMIC SYSTEM WITH PHASED ANTENNA ARRAY", the entirety of which is incorporated by reference herein.

BACKGROUND

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of oil exploration such as, for example, locating or storing subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. The vibrations from the energy source propagate through the earth, taking various paths, refracting and reflecting from discontinuities in the subsurface, and are detected by the array of vibration sensors. Signals from the sensors are amplified and digitized, either by separate electronics or internally in the case of "digital" sensors. The survey might also be performed passively by recording natural vibrations in the earth.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure.

Recently, seismic survey systems have been proposed that employ wireless telemetry to communicate seismic data between modules. For example, modules may communicate serially from remote modules to a central recording station or the like along serial data transfer paths established among the modules in an array. Accordingly, communications of modules within a serial data transfer path or between different serial data transfer paths may be subject to interference. The interference between modules may slow or limit the ability to transmit data wirelessly, which may in turn slow or add cost to a seismic survey.

SUMMARY

The present disclosure is generally related to methods and apparatuses for use in facilitating wireless communication between wireless modules in an array. In particular, the present disclosure generally relates to the reduction in interference between wireless modules in an array. As such, embodiments of modules described herein may employ space division multiplexing to reduce interference between modules.

In this regard, embodiments of modules described herein may include an antenna to facilitate the communication of data between modules. The antenna may be a smart antenna with smart signal processing algorithms used to identify a spatial signal signature of a signal such as the direction of arrival (DOA) of the signal. In turn, the smart antenna may be used to calculate beamforming vectors to track and locate the antenna beam on a target. In turn, the antenna may be capable of being directionalized with respect to a target. The directionalization of the antenna may be used during transmission and/or reception at the antenna.

In an embodiment, embodiments of antennas described herein may be an adaptive array antenna such as a phased array antenna or the like. In this regard, the antenna may control various antenna elements in an array. The control of the various elements in the antenna array may result in coordinated constructive and destructive interference that may result in control of the radiation pattern of the antenna. As such, the direction in which the antenna transmits or receives may be controlled by control of the various elements of the antenna array. As the control of the various elements of the antenna array may be performed autonomously, the need to physically adjust or aim an antenna may be eliminated.

Smart antennas capable of identifying a spatial signal signature of a signal and controlling a radiation pattern with respect to a target may be employed in embodiments of a wireless seismic survey system. For example, the smart antenna may employ space division multiplexing to facilitate reduced potential for interference between modules in an array. For example, interference may be reduced between modules in a common serial data transfer path or between modules in different serial data transfer paths.

Furthermore, use of smart antennas to direct a radiation pattern at a target may facilitate reduced power consumption of the modules. In this regard, rather than use of an omnidirectional antenna to propagate a signal, a targeted radiation pattern may be employed that requires less energy to propagate a signal. As such, the power consumption for a given module may be reduced by directed radiation only in a direction corresponding to a target.

As such, a significant drawback related to the use of wireless module in a seismic survey is the potential for interference between adjacent modules. Previous approaches to wireless systems may include assigning a multiplexing signature corresponding to the signal (e.g., a specific frequency, code, time, etc.) for transmission of data in the seismic survey to reduce the potential for cross talk with adjacent modules that are transmitted using an omnidirectional antenna. For example, U.S. Pat. No. 7,773,457, which is co-owned by the assignee of the present application and incorporated herein by reference, describes a wireless seismic survey system that may employ multiplexing signatures such as frequency division multiplexing, code division multiplexing, time division multiplexing, or other multiplexing signatures to reduce the potential for cross talk between modules in an array using omni-directional antennas.

However, it is presently recognized that a smart antenna may be employed to improve the multiplexing of data transmissions in the array while reducing the power consumption for a given module. The use of directionalized radiation patterns by smart antennas may allow the transmission and/or reception of data that is limited to a direction corresponding to a target module intended for communication.

The control of the radiation pattern of a smart antenna may be controlled in a continuum of directions corresponding to a spherical coordinate system relative to the antenna. For example, the control of the direction of radio frequency energy may be such that an azimuth angle and/or polar angle may be controlled when the antenna is modeled as a point at the origin of the spherical coordinate system. The radial length of the radiation pattern may be controlled by the power output of the antenna. As such, the direction of transmission or reception of the antenna may be controlled completely within a spherical coordinate system surrounding the antenna. Accordingly, the space division multiplexing techniques employed herein may provide for multiplexing of signals surrounding a module (i.e., controlling the radiation pattern with respect to directions relative to a surface on which the module is disposed according to the azimuth angle described above) as well as with respect to modules at different elevations (i.e., controlling the radiation pattern with respect to the height of the module above the surface or relative to other modules in the array according to the polar angle described above).

In an embodiment, a module of a seismic survey system may perform a discovery process upon initiation of the module. In this regard, the module may perform a scan for adjacent modules utilizing a smart antenna as described above. In this regard, the modules searched for in the discovery process may include another wireless data acquisition module or another wireless module in the array (e.g., a repeater, a timing device, a base station unit, etc.). Furthermore, by an adjacent module, it is meant a module located near the scanning module. This may or may not correspond to the next closest module to the scanning module. For instance, a transmission protocol may involve skipping or alternating modules such that serial data transfer paths may be interleaved in a row of modules. In this regard, an adjacent module may correspond to a more remote module than the nearest module to the scanning module. Furthermore, the scanning process may result in identification and/or location of a plurality of adjacent modules.

In any regard, the scanning may result in detection of at least one spatial signal signature of a signal of another module in the array such as the direction of arrival (DOA) of the signal. Upon discovering the adjacent module and the spatial signal signature of the other module, the scanning module may store the spatial signal signature (e.g., corresponding to the direction of the adjacent module). In turn, when establishing communication with the identified other module, the scanning module may control the radiation pattern of the antenna to target the other module. In this regard, the module may target reception or transmission of radio frequency energy in the direction of the spatial signature when communicating with the adjacent module.

Furthermore, a module of a seismic survey system may modify the radiation pattern of the antenna corresponding to different targets. For example, the module may have different target modules depending upon whether the module is receiving data or transmitting data. For example, a module in a serial data transfer path may target (e.g., control the radiation pattern of the antenna to be directed toward) an upstream module to receive data in a first period from the upstream module. The module may target a downstream module to transmit data in a second period to the downstream module. In this regard, the module may direct the radio frequency energy reception and transmission capabilities of the antenna depending upon whether the module is to transmit data to a downstream module or receive data from upstream module. That is, the module may target different other modules in different time periods for reception and/or transmission of data.

While the targeting of radiation patterns to avoid interference between wireless modules may be specifically implemented in a wireless seismic survey system, other wireless module arrays may also employ similar techniques. For example, any type of module operable for wireless communication may employ the techniques described herein. The module may be in operative communication with a sensor. The sensor may correspond to any type of sensor known in the art such as, for example, a weather sensor, a camera, motion detectors, biometric sensors, or any other type of sensor known in the art. In this regard, the data transmitted between modules may correspond to any type of data captured by sensor in operative communication with the wireless module such as for example video data, weather data, or the like.

BRIEF DESCRIPTION OF THE FIGURES

FIGS. 6 and 7 are schematic views illustrating a first and second time period, respectively, of a serial data transfer path in a wireless array.

DETAILED DESCRIPTION

Figure 1:
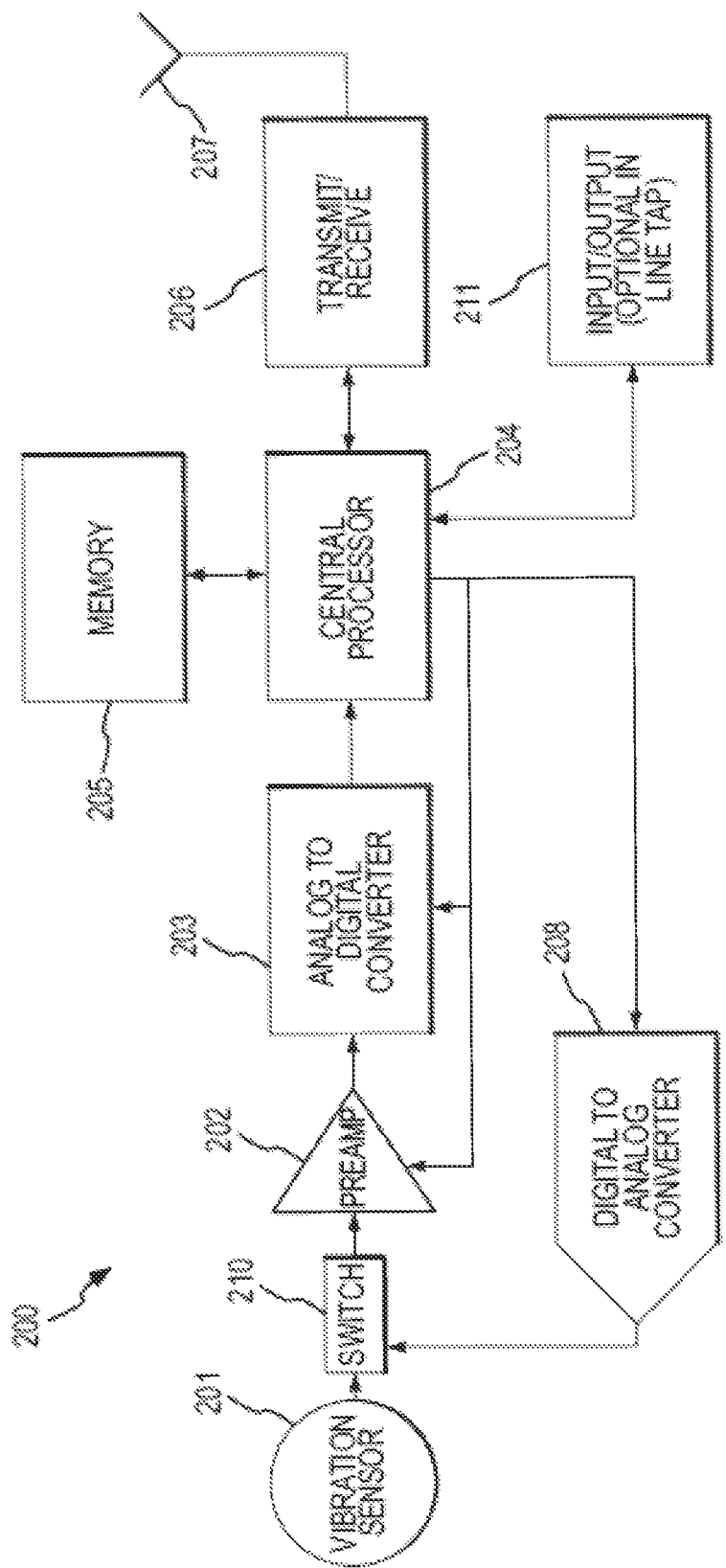
FIG. 1 is a schematic drawing of an embodiment of a wireless module according to the present invention.

FIG. 1 shows a block diagram of a wireless remote acquisition and relay module 200 in accordance with an embodiment of the present invention. A vibration sensor 201 converts vibrations into electrical signals which are fed through switch 210 to preamplifier 202 and thence to the analog to digital (A/D) converter 203. The digital data from the A/D converter 203 is fed into the Central Processor 204 or directly into a digital memory 205. Alternately, in the case of a sensor 201 with direct digital output, the signals may flow directly to the processor 204 or memory 205.

In addition to controlling the system and storing the data in the memory, the processor 204 may perform some calculations on the data including decimation, filtering, stacking repetitive records, correlation, timing, etc. The remote module 200 may also receive information through the transceiver 206, for example: timing information, cross-correlation reference signals, acquisition parameters, test and programming instructions, location information, and seismic data from upstream modules and updates to the software among other commands. The transmit and receive signals couple through antenna 207.

The processor 204 can control the transceiver 206, including transmit/receive status, frequencies, power output, and data flow as well as other functions required for operation. For example, the antenna 207 may be a smart antenna such as a phased array antenna. Accordingly, the processor 204 may control the radiation pattern of the antenna 207 (e.g., via selective activation, deactivation, and/or control of elements of an antenna array) as will be described in greater detail below.

The remote module 200 can also receive data and commands from another remote module or base station, store them in the memory, and then transmit them again for reception by another remote module up or down the line.

A digital-to-analog (D/A) converter 208 may be included in the system which can accept digital data from the processor 204 to apply signals through a switch 210 to the input circuitry. These signals, which may for example consist of DC voltages, currents, or sine waves, can be digitized and analyzed to determine if the system is functioning properly and meeting its performance specifications. Typical analysis might include input noise, harmonic distortion, dynamic range, DC offset, and other tests or measurements. Signals may also be fed to the sensor 201 to determine such parameters as resistance, leakage, sensitivity, damping and natural frequency. The power supply voltage may also be connected through the switch 210 to the A/D converter 203 to monitor battery charge and/or system power. The preamplifier 202 may have adjustable gain set by the processor 204 or other means to adjust for input signal levels. The vibration sensor 201 may be a separate generic unit external to the remote module 200 and connected by cables, or the sensor 201 might be integral to the remote module package.

If the remote module 200 is to be used as a base station, equivalent to a "line-tap" or interface to the central recording system, it will also have a digital input/output function 211 which may be, for example, an Ethernet, USB, fiber-optic link, or some computer compatible wireless interface (e.g., one of the IEEE 802.11 standards) or another means of communication through a wired or radio link. It may be acceptable to use larger battery packs for the line tap wireless data acquisition and relay modules because they will normally be relatively few in number and may communicate over greater distances using a high speed data communication protocol.

The remote module 200 is constructed of common integrated circuits available from a number of vendors. The Transmit/Receive integrated circuit 206 could be a digital data transceiver with programmable functions including power output, timing, frequency of operation, bandwidth, radiation pattern, and other necessary functions. The operating frequency band may preferably be a frequency range which allows for unlicensed operation worldwide, for example, the 2.4 GHz range. The Central Processor 204, Memory 205, and switch 210 can include any of a number of generic parts widely available. The A/D converter 203 could preferably be a 24-bit sigma delta converter such as those available from a number of vendors. The preamplifier 202 should preferably be a low-noise, differential input amplifier available from a number of sources, or alternatively integrated with the A/D converter 203. The D/A converter 208 should preferably be a very low distortion unit which is capable of producing low-distortion sine waves which can be used by the system to conduct harmonic distortion tests.

Figure 2:
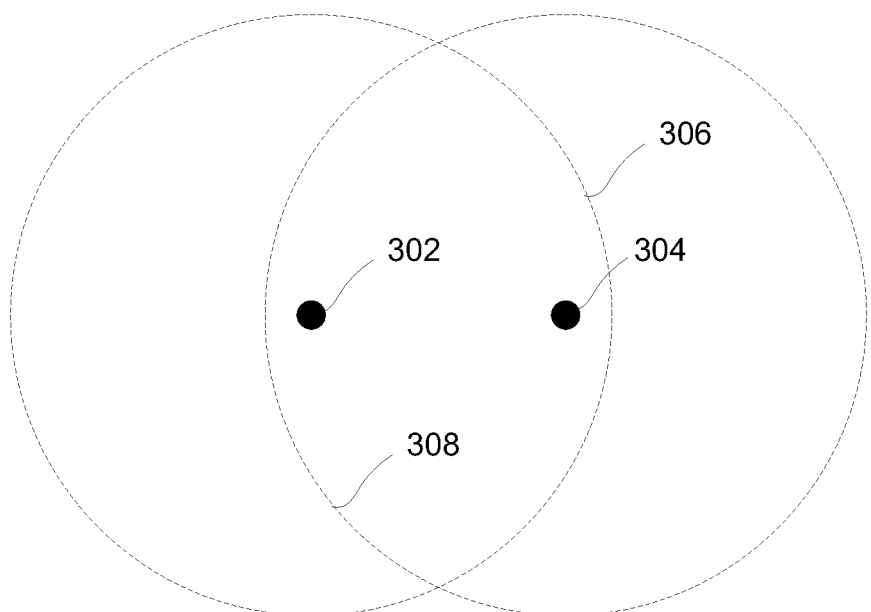
FIG. 2 is a schematic view illustrating an embodiment of two wireless modules.
Figure 3:
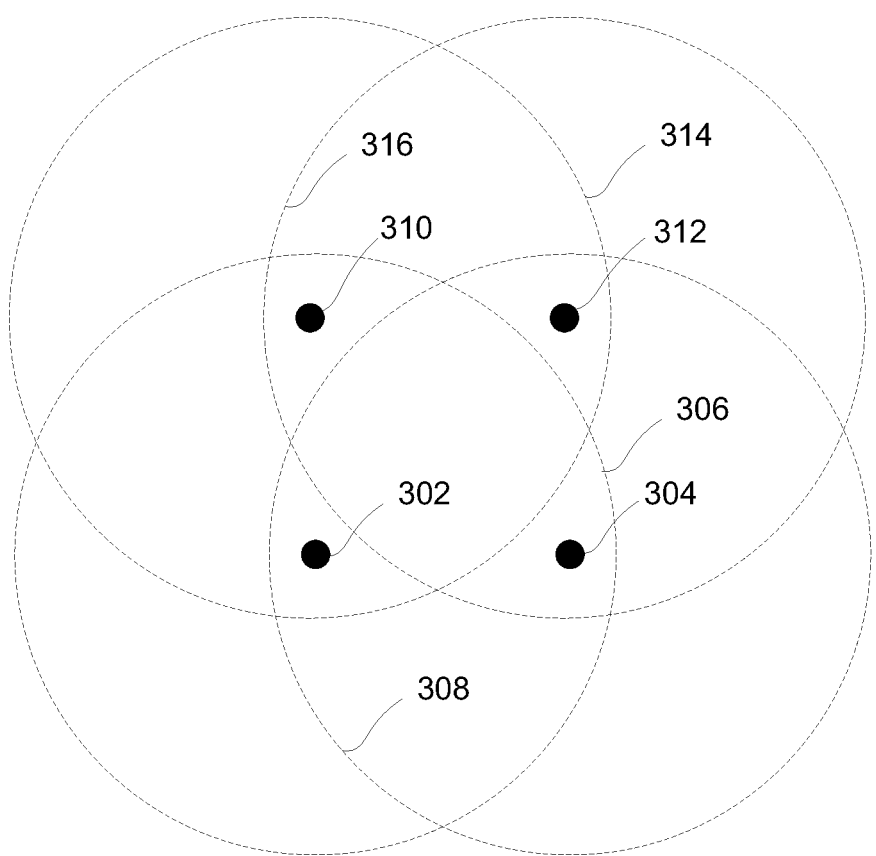
FIG. 3 is a schematic view illustrating an embodiment of four wireless modules.

The module 200 may include a number of other components not shown in FIG. 2, such as separate transmit and receive antennae (either or both of which may be smart antennae), separate antennae for location signals and seismic data transfer signals, GPS receivers, batteries, etc.

The following example depicts how the system can acquire seismic data continuously. Assume that every module is sampling the vibration signals at 500 samples per second with a resolution of 24 bits per sample. The seismic data from the vibration sensor is digitized and stored in memory. While this is taking place, the transceiver 206 is receiving data from the next module more remotely located to the central recording system. After some amount of data is collected from the sensor 201 and the other modules, the module switches to transmit mode and sends some packets of data collected from the sensor 201 and the other modules on towards a module closer to the central recording system. Each packet of data is also annotated with some identification as to the original source sensor and the time acquired. The module continues to acquire and store data during the transmit phase so there are no gaps in the record.

The time stamp annotation may come from a clock in the microprocessor or the radio. The clocks in all the modules may be periodically adjusted and synchronized with a signal from the central recording system or other source.

It may be appreciated that adjacent modules in a seismic survey array may communicate data associated with the seismic survey. For example, control data, administrative data, and/or seismic data may all be communicated between adjacent modules. Some prior approaches to communication of data may involve the use of an omni-directional antenna to facilitate transmission and/or receipt of data. Furthermore, some systems have contemplated the use of permanent directional antenna to facilitate communication between modules. Directional antennas may reduce power consumption as the radiation pattern may be limited to a direction toward a target module. Thus, the energy associated with the radiation pattern directed to the target module may be much less than an omni-directional antenna that generally broadcast uniformly about the antenna.

However, permanent directional antennas may present disadvantages that are especially clear in the case of deployed wireless modules in a seismic array. For example, the seismic modules may be deployed in a semi-random or arbitrary manner. In this regard, the provision of permanent directional antennas may require a user deploying each module to aim the antenna at each successive module. Also, permanent directional antennae are susceptible to movement after deployment (e.g., due to weather, livestock, vandals, etc.). Movement of the permanent directional antennae may result in misalignment and loss in communication. Thus, while the use of permanent directional antenna may provide power consumption advantages, the permanent directional antenna may add increased costs and time to the setup or deployment of modules in a survey.

Accordingly, omni-directional antennas may be provided with each wireless module. For example, two modules 302 and 304 employing omni-directional antennae are shown in FIG. 2. The radiation patterns 306 and 308 (represented in FIG. 2 by dotted lines) may generally extend uniformly about each module 302 and 304. The fully circular radiation pattern displayed may be idealized in that actual radiation patterns may appear more nodal than a uniform circular pattern, however for clarity, the radiation patterns of the omni-directional antenna of modules 302 and 304 are approximated as circular patterns. The radiation patterns 306 and 308 shown in FIG. 2 may correspond to both the transmission pattern and reception pattern of each module 302 and 304. That is, the antenna for the modules 302 and 304 may be operative to transmit or receive radio frequency energy according to radiation pattern 306 and 308, respectively.

As may be appreciated in FIG. 2, as additional modules 310 and 312 having radiation patterns 314 and 316, respectively, are introduced adjacent to modules 302 and 304, the omni-directional antennas may include relatively large radiation patterns that encompass a number of different ones of the modules. In this regard, adjacent modules, especially in adjacent serial lines of modules may present the potential for interference in the form of interference between modules. That is, more than one module (e.g., module 302) may be contained within a radiation pattern of a plurality of different modules (e.g., module 304 and module 310) such that absent multiplexing signature, interference may occur.

However, a smart antenna that may facilitate a directional radiation pattern may be employed to overcome the foregoing issues presented with respect to permanent directional antennas and omni-directional antennas. For example, the smart antenna may comprise a phased array antenna that is operable to modify the radiation pattern of a module in real time by activating different ones of a plurality of antenna elements. As such, issues associated with permanent directional antennas may be avoided because a phased array directional antenna may continuously monitor and/or modify the radiation pattern to adjust for movement or changes in the relative location of a target, which a permanent directional antenna cannot. In this regard, the targeting of the radiation pattern may be accomplished using control of the phase array rather than requiring a user to manually manipulate a physical portion of the antenna relative to an adjacent module.

Furthermore, the radiation pattern of a smart antenna (e.g., phased array antenna) may be significantly narrower in coverage than an omni-directional antenna. In this regard, radio frequency energy may be directed specifically towards a target module. In this regard, the amount of energy required by a module utilizing a smart antenna may be reduced by transmitting to and receiving from a limited to a direction. That is, for a given distance in the direction in which the radiation pattern is directed, to communicate with a target at a given distance may require less energy than propagating a signal with an omni-directional antenna that would also include the target. Thus, for a given amount of energy, the distance a radiation pattern may extend in the limited direction may be increased over an omni-directional antenna.

Figure 4:
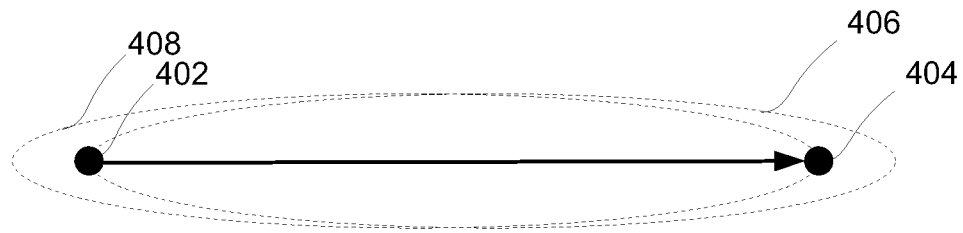
FIG. 4 is a schematic view illustrating an embodiment two wireless modules with directionalized radiation patterns.

Furthermore, the pair of communicating modules may utilize corresponding radiation patterns to selectively transmit and selectively receive radio frequency energy in a direction extending between the pair of communicating modules. That is, the phased array antenna may allow for targeted reception of radio frequency energy from an adjacent module as well as targeted transmission of radio frequency energy from an adjacent module. In this regard, as shown in FIG. 4, module 402 may transmit data to module 404. Module 402 may have a directional radiation pattern 406 targeted at module 404. Similarly, module 404 may have a targeted radiation pattern 408 for reception of a transmission from module 402. The respective antennae of the modules 402 and 404 may be controlled so as to target the radiation pattern toward the other respective module.

Figure 5:
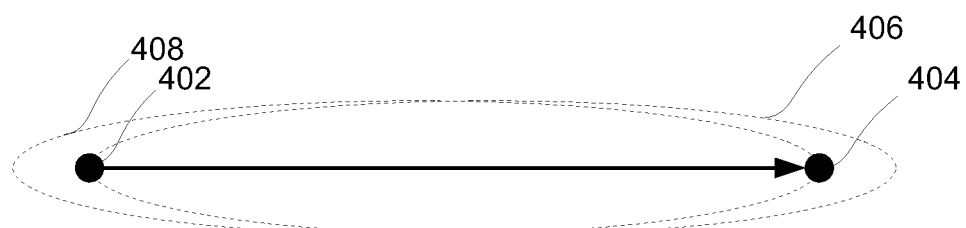
FIG. 5 is a schematic view illustrating an embodiment of four wireless modules with directionalized radiation patterns.
Figure 5:
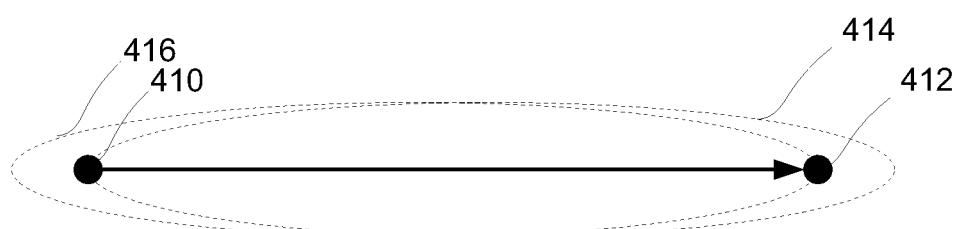

In this regard, as shown in FIG. 5, as additional modules 410 and 412 are introduced near modules 402 and 404, the radiation patterns 414 and 416 may be controlled to avoid interference between the transmission between module 402 and 404. The modules 410 and 412 may be modules within a serial data transfer path to which modules 402 and 404 belong or may be in a different serial transfer path.

Furthermore, in a serial data communication path, the targeted radiation pattern associated with transmission and/or reception of data from a module may be modified during the communication of data along the serial data path. For example, a serial data communication path may be defined by a series of wireless modules that may employ a full duplex communication technique. In this regard, each module may in a first time period receive data from an upstream module and in second time period transmit data to a downstream module. In this regard, in alternating time periods, a module may receive data from an upstream module and transmit data to a downstream module.

Accordingly, a module may change the direction in which an antenna is targeted each of the time periods. For example, the antenna may be targeted in a first direction in a first time period. For example, the first direction may correspond with upstream module from which the module is to receive data. In a second time period, the module may modify the direction in which the antenna is targeted into a second direction. The second direction may correspond to a downstream module to which the modules to transmit data.

FIGS. 6 and 7 depict a portion of a serial data transfer path 500 defined by modules 502, 504, 506, and 508. The serial data transfer path 500 may extend to additional upstream and/or downstream modules not depicted. FIG. 6 may correspond to a first time period and FIG. 7 may correspond to a second time period.

Accordingly, in FIG. 6, module 502 may target module 504 such that the radiation pattern 510 for module 502 is directed toward module 504. While not shown in FIG. 6 for clarity, module 504 may also target module 502 by targeting a radiation pattern toward module 502. In this regard, module 502 may transmit to module 504 in time period one. Similarly, module 506 may target module 505 such that the radiation pattern 512 for module 506 is directed toward module 508. In this regard, module 506 may transmit to module 508 in time period one.

In time period two depicted in FIG. 7, module 502 may receive data from an un-shown upstream module. Module 504 may transmit data to module 506. In turn, radiation pattern 514 may be targeted toward module 506. Also, module 508 may direct radio pattern 516 to an unshown downstream module. Accordingly, the direction of transmission and reception of the modules 502, 504, 506, and 508 may be modified between time period one and time period two corresponding to reception and transmission at different modules.

Furthermore, during deployment of a wireless modules in a seismic survey array, a discovery process may be initiated at each module. During the discovery process, the smart antenna may scan for an adjacent module. The smart antenna may be operable to identify a spatial signal signature (e.g., angle of arrival (AOA), etc.) of a signal of an adjacent module. For example, antenna elements of a phased array antenna may be controlled to scan throughout a continuum of directions corresponding to a sphere surrounding the module. Once the spatial signal signature is identified, the module may generate a beamforming vector for use in controlling the antenna to target the discovered module. The beamforming vector may correspond with the relative direction of the adjacent module such that the direction of the radiation pattern corresponds to the relative direction to the adjacent module. In this regard, during periods where the module communicates with the adjacent module, the antenna may be controlled to target the radiation pattern of reception and/or transmission capability towards the adjacent module. More than one adjacent module may be located such that a different beamforming vector is established relative to each adjacent module. Furthermore, a scanning process may occur periodically or continuously during the seismic survey to ensure the targeted directions of adjacent modules are correct.

As the locations of the adjacent modules are determined during the discovery process by scanning the antenna (e.g., using a phased array antenna), the need for an operator to physically aim or level hardware (as is the case with a permanent directional antenna) may be eliminated. In this regard, modules may simply be deployed in the field and undergo discovery process such that the corresponding direction of adjacent modules are automatically discovered during the scanning process of a phased array antenna. In this regard, once an adjacent module is discovered, the scanning module may target the adjacent module when communicating data between the scanning module and the adjacent module. The data communicated may include seismic data acquired at either of the scanning module or the adjacent module. In addition, other data may be transmitted between the modules (e.g., along with or independently from seismic data) such as, for example, timing data, control data, administrative data, setup data, status data, or other appropriate data.

Figure 8:
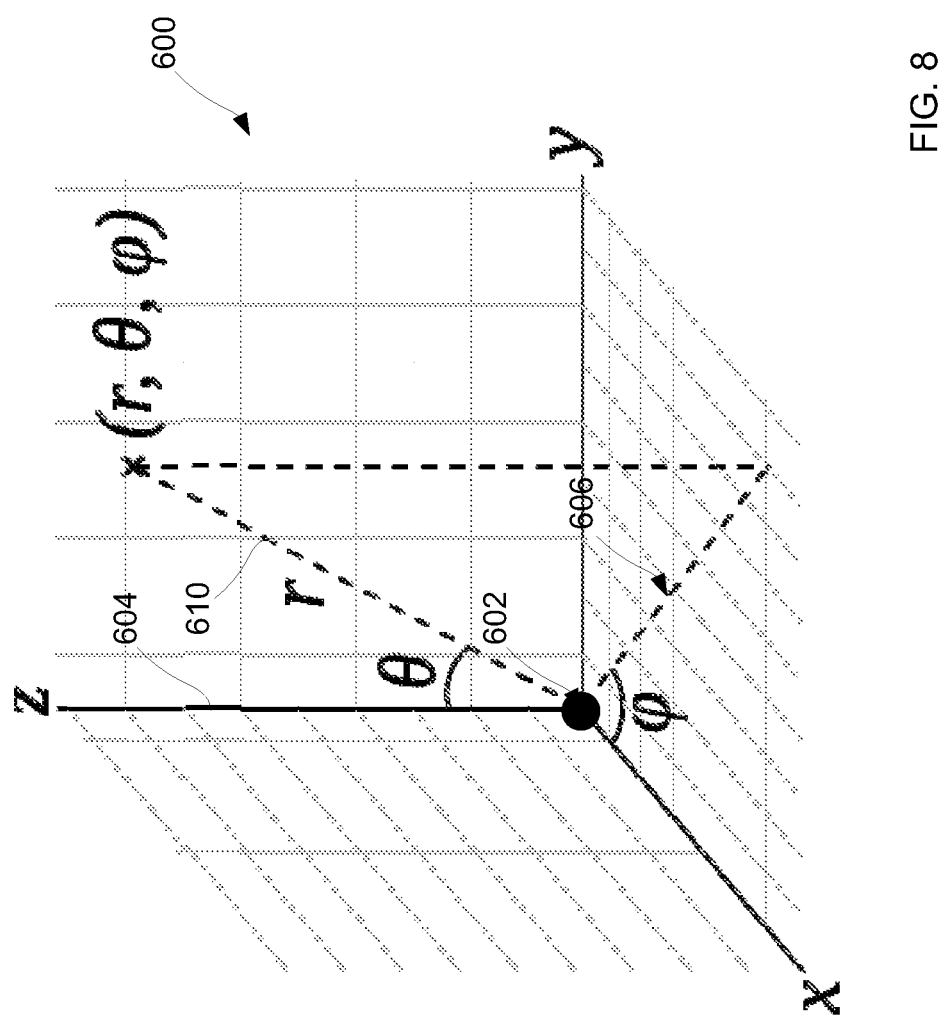
FIG. 8 is a schematic view illustrating a spherical coordinate system defining a continuum of directions through which a radiation pattern may be controlled.

With further reference to FIG. 8, it may be appreciated that a phased array antenna may be capable of controlling the direction of a radiation pattern 610 for the antenna throughout a continuum of positions associated with a spherical coordinate system 600. In this regard, the phased array antenna may be modeled in a spherical coordinate system 600 where the phased array antenna 602 is located in origin of the spherical court system 600. As such, a polar angle θ corresponding to the direction of the radiation pattern 610 measured from a fixed zenith direction 604 may be controlled. Furthermore, an azimuth angle φ corresponding to an angle defined in a reference plane 606 corresponding to an orthogonal projection that passes through the origin that is orthogonal to the zenith 604 may be controlled. Furthermore, radial distance r may be controlled based on controlling the relative power of the transmission or reception gain of the antenna. In any regard, the direction of the radiation pattern 610 may be controlled throughout a continuum of direction defined in the spherical coordinate system surrounding the antenna.

FIG. 8 shows only a portion of the spherical coordinate system (e.g., corresponding to the positive x, positive y, and positive z directions, it will be understood that the direction in which the radiation pattern may be controlled may extend to all directions in the spherical coordinate system (e.g., including the negative x, negative y, and negative z directions relative to the coordinate system 600 shown in FIG. 8). As such, the radiation pattern 610 may extend in any direction away from the antenna 602 without limitation.

Figure 9:
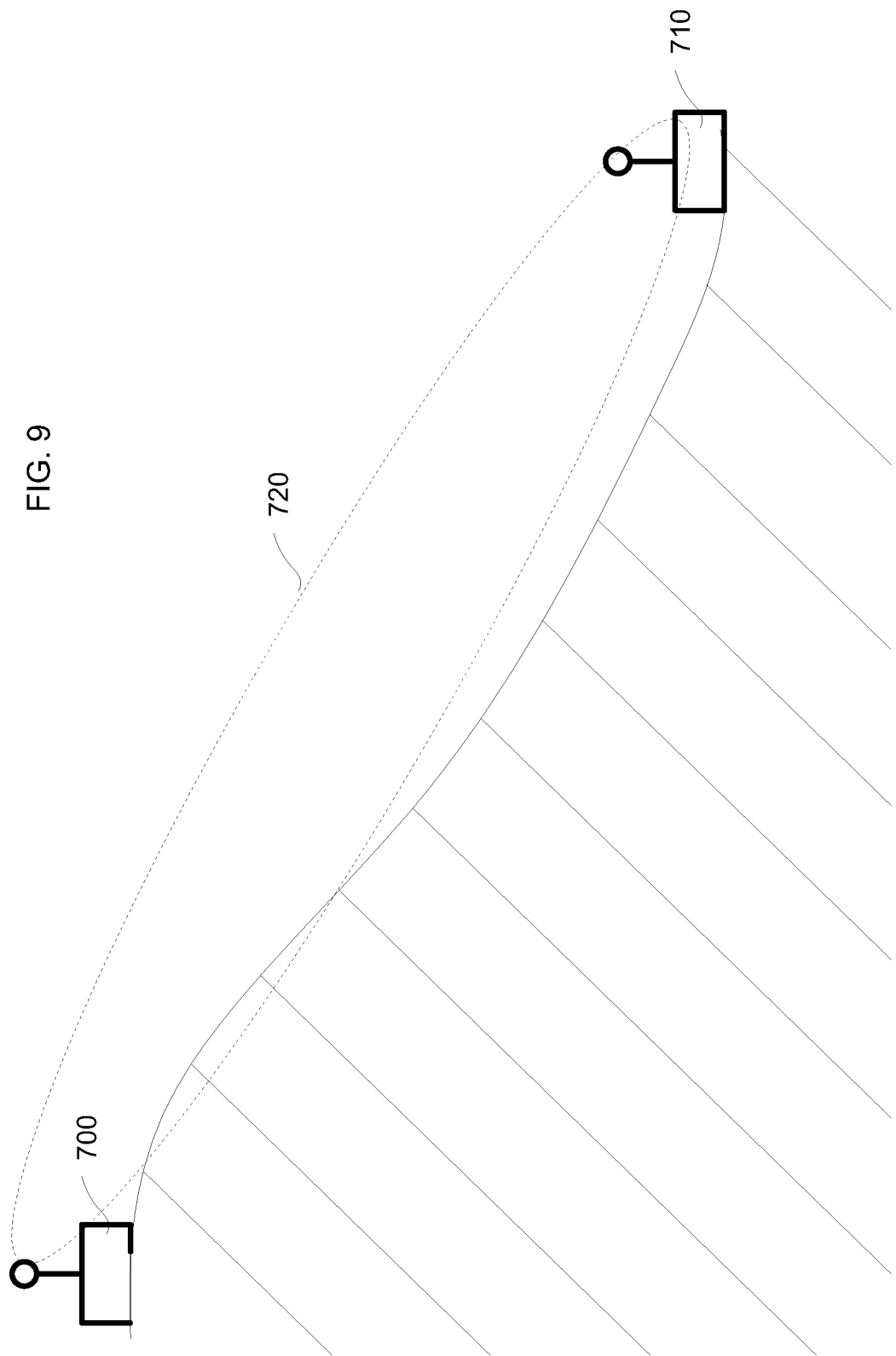
FIG. 9 to schematic view illustrating a directionalized radiation pattern of the module targeting another module at a different elevation than the module.

In this regard, with further reference to FIG. 9, in addition to targeting the radiation pattern of a module at a common elevation, the antenna be controlled to target adjacent modules located at different elevations relative to one another. For example, in FIG. 9, first module 710 located at an elevation higher than a second module 710 may target the second module 710 with radiation pattern 720. As such, the radiation pattern may be controlled such that modules at different elevations may be targeted as well.

The control of the radiation pattern relative to the polar angle θ (i.e., to vary the targeted elevation of the radiation pattern of the antenna) may also be employed to provide space division multiplexing between adjacent modules based on different elevations of antennas. For example, different modules with different height antennas may be employed. In this regard, two adjacent modules having a common height antenna may broadcast and receive signals, respectively, in a polar angle perpendicular to the zenith of a spherical coordinate system toward one another. That is, the transmission pattern between the modules may be level relative to a surface on which the modules are disposed such that adjacent modules having similar height antennas may communicate. Furthermore, different adjacent modules may include antennae at a second height different than the first height of the antennas. Accordingly, the different adjacent modules may also broadcast in a relatively flat plane (i.e., perpendicular to the zenith) such that only modules within the plane of the second height may receive broadcasts. Furthermore, transmission between modules having antennas of different heights may be facilitated by controlling the radiation pattern relative to the polar angle θ to target adjacent modules at different elevations or with antennas at different heights.

In sum, modules may be provided with a smart antenna capable of controlling a radiation pattern of the antenna. As such, spatial division multiplexing may be employed to prevent interference between modules in an array. As a controllable smart antenna may be employed, the need to physically aim an antenna may be eliminated as the smart antenna may directionalize the radiation pattern throughout a continuum of positions autonomously at the module. In turn, a module may scan, locate, and target adjacent modules for communication.

What is claimed is:

1. A seismic data acquisition module, comprising:
a seismic sensor for receiving seismic energy and outputting first seismic data indicative of the sensed seismic energy;
a processor in operative communication with the seismic sensor, the processor operable to communicate the first seismic data to a transceiver for transmission of the first seismic data from the seismic data acquisition module; and
an antenna, in operative communication with the transceiver, wherein the antenna is operable to autonomously control a direction of transmission to direct a signal comprising the first seismic data in a first given direction of a continuum of directions for communication of the first seismic data in the first given direction and to autonomously control a direction of reception to receive a signal comprising second seismic data from a second given direction from a continuum of directions, wherein the first given direction and the second given direction are different.

2. A seismic data acquisition module according to claim 1, wherein the antenna comprises a phased array antenna.

3. A method for use in seismic data acquisition, comprising:
deploying a seismic data acquisition module in a seismic survey area;
controlling the radiation pattern of an antenna at the seismic data acquisition module to scan, after the deploying, for at least one other wireless module in the seismic survey area in a plurality of directions;
discovering at least a first other wireless module and a second other wireless module in the seismic survey area;
receiving seismic data from the first other wireless module using a first controlled radiation pattern of the antenna corresponding to a first direction extending between the first other wireless module and the seismic data acquisition module; and transmitting data from the seismic data acquisition module to the second other wireless module using a second controlled radiation pattern of the antenna corresponding to a second direction extending between the seismic data acquisition module and the second other wireless module, wherein the first direction and the second direction are different.

4. The method of claim 3, further comprising:

identifying a spatial signal signature of a signal from the at least one other wireless module in the seismic survey array; and calculating beamforming vectors relative to the at least one other wireless module in the seismic survey array;

wherein the receiving and the transmitting is at least partially based on the calculated beamforming vectors.

5. A method for use in seismic data acquisition, comprising:

disposing, in series, a plurality of seismic data acquisition modules that are operative to wirelessly communicate acquired seismic data, wherein the acquisition modules define at least a first wireless serial data transfer path and a second wireless serial data transfer path for relaying data from upstream acquisition modules to downstream acquisition modules and a data collection unit; and controlling, during transmission and reception of acquired seismic data at each acquisition module, the radiation patterns of antennas in each of the first wireless serial data transfer path and the second wireless serial data transfer path after the disposing to prevent interference between seismic data acquisition modules in different ones of the first wireless serial data transfer path and the second wireless serial data transfer path.

6. A seismic data acquisition module, comprising:

a seismic sensor for receiving seismic energy and outputting seismic data indicative of the sensed seismic energy;

a transceiver operable to control transmission and receipt of data from the seismic data acquisition module; and an antenna, in operative communication with the transceiver, wherein the antenna is operable to autonomously control the direction of transmission and direction of reception of radio frequency energy at the antenna;

wherein the antenna is operable to receive data from a first seismic data acquisition module in a first time period when the antenna is automatically directed in a first direction corresponding to the first seismic data acquisition module; and wherein the antenna is operable to transmit data to a second seismic data acquisition module in a second time period when the antenna is automatically directed in a second direction corresponding to the second seismic data acquisition module.

7. A seismic data acquisition module according to claim 6, wherein the antenna comprises a phased array antenna.

8. The method of claim 6, wherein the antenna is operable to identify a spatial signal signature of a signal from at least one other wireless module in the seismic survey array and calculate beamforming vectors relative to the at least one other wireless module in the seismic survey array.

9. A method for use in seismic data acquisition, comprising the steps of:

disposing, in series, a plurality of seismic data acquisition modules that are operative to wirelessly communicate acquired seismic data, wherein the acquisition modules define a wireless serial data transfer path for relaying data from upstream acquisition modules to downstream acquisition modules and a data collection unit;

assigning a first acquisition module in the serial data transfer path a first spatial signal signature for reception of data at the first acquisition module via a first antenna and a second spatial signal signature for transmission of data from the first data acquisition module via first antenna; and assigning a second acquisition module in the serial data transfer path a third spatial signal signature for reception of data at the second acquisition module via a second antenna and a fourth spatial signal signature for transmission of data from the second data acquisition module via the second antenna, wherein the first and second spatial signal signatures are different and the third and fourth spatial signal signatures are different.

10. The method of claim 9, further comprising:

first transmitting, using the second spatial signal signature, seismic data from the first acquisition module to at least one downstream acquisition module; and second transmitting, using the fourth spatial signal signature, seismic data from the second acquisition module to at least one downstream acquisition module.

11. The method of claim 10, wherein at least a portion of the first transmitting and at least a portion of the second transmitting occur during a common transmission period.

12. The method of claim 11, wherein the first transmitting comprises the first acquisition module transmitting the seismic data to the second acquisition module.

13. The method of claim 12, wherein a radiation pattern associated with transmission from the first acquisition module and a radiation pattern associated with reception by the second acquisition module are at least partially overlapping.

* * * * *

UNITED STATES PATENT AND TRADEMARK OFFICE
CERTIFICATE OF CORRECTION

| | |
|---|---|
| PATENT NO. | : 9,841,517 B2 |
| APPLICATION NO. | : 14/042251 |
| DATED | : December 12, 2017 |
| INVENTOR(S) | : Elder et al. |

It is certified that error appears in the above-identified patent and that said Letters Patent is hereby corrected as shown below:

In the Claims

Column 12, Line 25, delete "via first" and insert therefore --via the first--

Signed and Sealed this
Thirteenth Day of March, 2018

Andrei Iancu
*Director of the United States Patent and Trademark Office*